R. H. McNAIR.
Cog Gearing.
No. 232,612.   Patented Sept. 28, 1880.
Fig.1.
Fig.2.
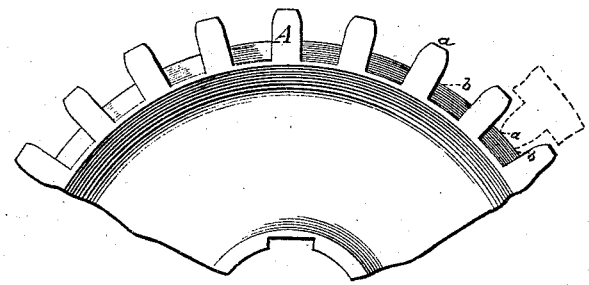
Witnesses:
Inventor:
Robert Hanes McNair

UNITED STATES PATENT OFFICE.

ROBERT H. McNAIR, OF ELSAH, ILLINOIS.

COG-GEARING.

SPECIFICATION forming part of Letters Patent No. 232,612, dated September 28, 1880.

Application filed February 11, 1880.

*To all whom it may concern:*

Be it known that I, ROBERT HANES MCNAIR, of the village of Elsah, in the county of Jersey and State of Illinois, have invented a new and useful Improvement in Cog-Gearing, of which the following is a specification.

This invention relates to cog-gearing used where dust and other obstructions are liable to clog the wheels.

In the accompanying drawings, Figure 1 represents a sectional view, and Fig. 2 a side view.

Heretofore such gearing had to be covered or cased, so as to keep out such obstructions, or to be watched and cleaned, or they would either throw the shafts out of line or cause other damage.

The object of my invention is to provide cog-wheels that will clear themselves or each other from such obstructions, thereby doing away with the necessity of such covering or casing in most cases.

This I accomplish by making my cogs A but slightly, if any, longer from the pitch-line to the bottom of the cog than it is from said line to point of cog, and in making the bottom of the cog a $\wedge$ shape.

The square end $a$ of the cog of one wheel impinges on the sharp edge $b$ in the bottom of the cog of the other wheel, thereby forcing all obstructions out through the groove formed by the cut of the $\wedge$.

What I claim is—

The inverted-V-shaped spaces between the teeth of cog-gear wheels, as and for the purpose set forth.

ROBERT HANES McNAIR.

Witnesses:
 J. H. ONETTO,
 C. A. ONETTO.